United States Patent [19]

Streck

[11] Patent Number: 4,852,153
[45] Date of Patent: Jul. 25, 1989

[54] SINGLE LINE MASTER TELEPHONE WITH FAX CONNECTION

[75] Inventor: Donald A. Streck, Ojai, Calif.
[73] Assignee: Jerry R. Iggulden, Santa Clarita, Calif.
[21] Appl. No.: 230,958
[22] Filed: Aug. 11, 1988

Related U.S. Application Data

[63] Continuation-in-part of Ser. No. 170,380, Mar. 18, 1988.

[51] Int. Cl.[4] ................. H04M 11/00; H04M 1/72
[52] U.S. Cl. ............................. 379/100; 379/397; 379/442
[58] Field of Search ............... 379/100, 98, 94, 93, 379/105, 102, 442, 387, 397

[56] References Cited

U.S. PATENT DOCUMENTS

| 4,623,758 | 11/1986 | Batla et al. | 379/80 |
| 4,639,553 | 1/1987 | Kiguchi | 379/377 |
| 4,677,660 | 6/1987 | Yoshida | 379/100 |
| 4,773,080 | 9/1988 | Nakajima et al. | 375/5 |

FOREIGN PATENT DOCUMENTS

| 3042885 | 5/1982 | Fed. Rep. of Germany | 379/100 |
| 3107271 | 9/1982 | Fed. Rep. of Germany | 379/100 |
| 0215163 | 12/1983 | Japan | 379/100 |
| 0025466 | 2/1984 | Japan | 379/98 |
| 0259058 | 12/1985 | Japan | 379/100 |
| 0198853 | 9/1986 | Japan | 379/100 |
| 0242449 | 10/1986 | Japan | 379/100 |

*Primary Examiner*—Thomas W. Brown
*Attorney, Agent, or Firm*—Donald A. Streck

[57] ABSTRACT

A telephone/facsimile system including a plurality of telephones and a facsimile device connected to a common telephone line wherein incoming calls are automatically switched from the telephone to the facsimile device as appropriate and the use of a common telephone line for the telephone and the facsimile device for both incoming and outgoing calls is transparent to users. There is a master telephone including, a telephone handset; telephone circuitry connected to the telephone handset and having a telephone tip and ring input thereto; a switch for switching a telephone line connected thereto at an input thereof between first and second output positions thereof, the switch having the telephone circuitry tip and ring input operably connected to the first output position thereof and capability for connecting the facsimile device to the second output position thereof; and, logic having an input connected to the input of the switch and an output operably connected to switch the switch between the first and second output positions for answering an incoming call on the telephone line, for determining whether the incoming call is from a facsimile device, for switching the switch to connect the first output position when an incoming call from a non-facsimile device is detected, and for switching the switch to connect the second output position when an incoming call from a facsimile device is detected, the logic sensing when a telephone or a facsimile device has been picked up for use in placing an outgoing call and for connecting only the picked up type of device to the telephone line until a hang-up condition is sensed. There is a plug receptacle for receiving a plug containing the telephone line and a pair of spare wires. A pair of interconnecting wires connect the switch and the plug receptacle.

6 Claims, 2 Drawing Sheets

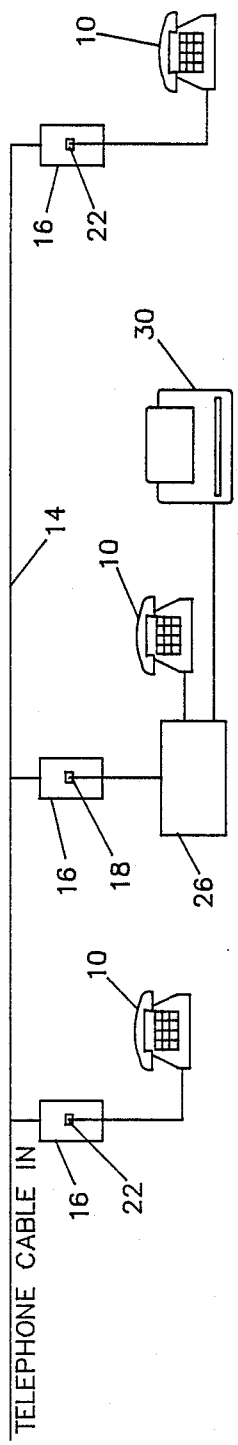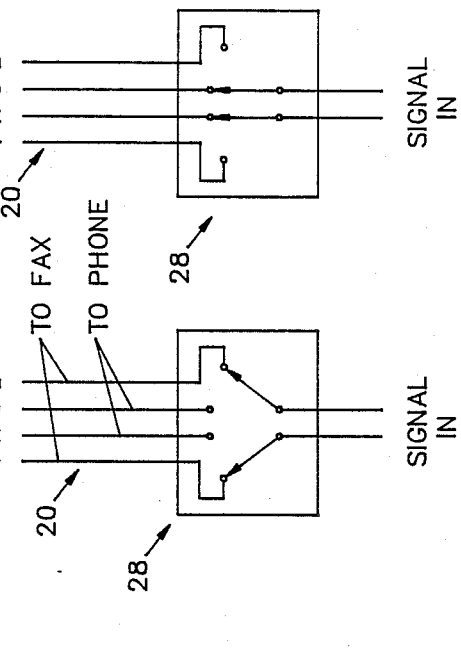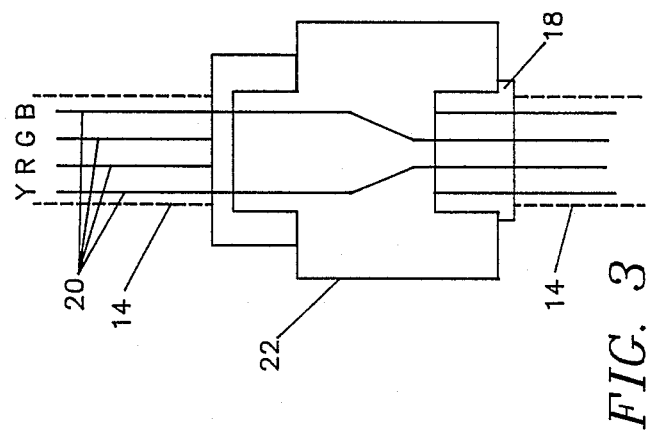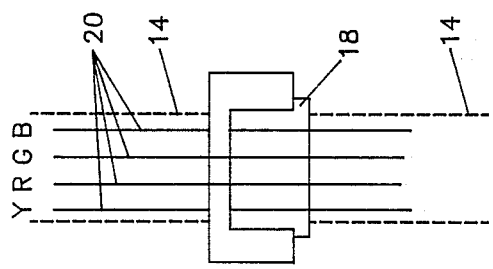

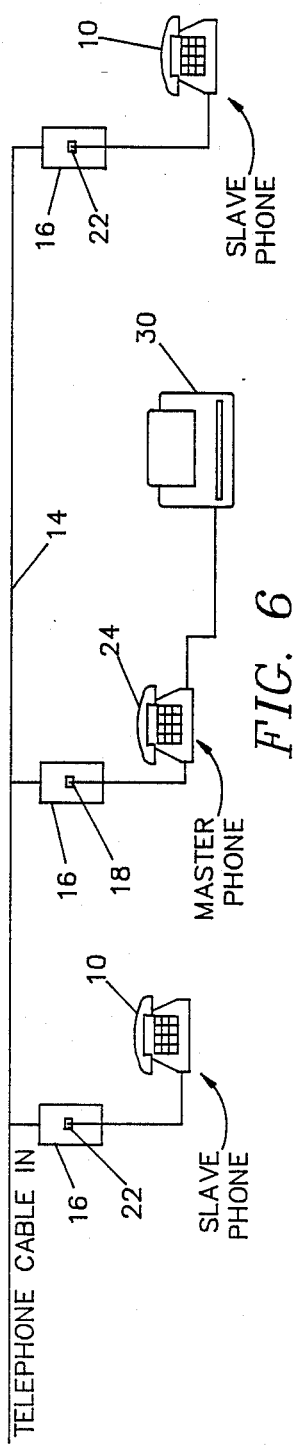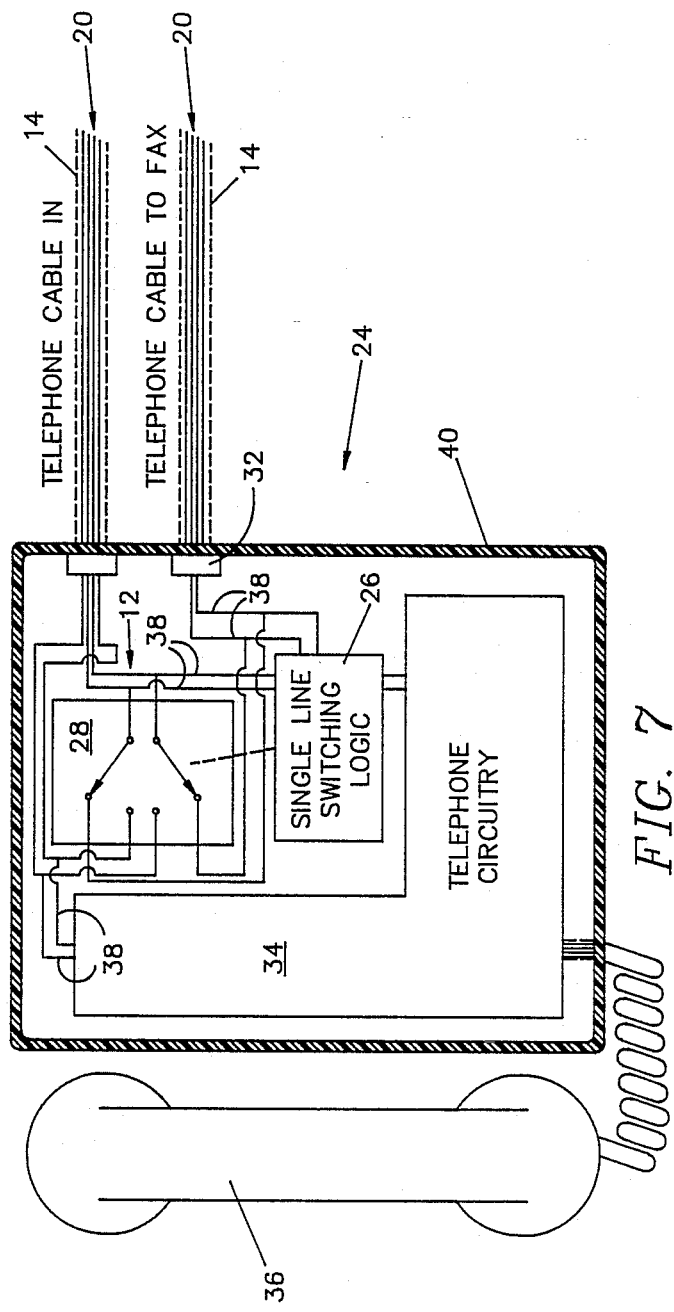

SINGLE LINE MASTER TELEPHONE WITH FAX CONNECTION

BACKGROUND OF THE INVENTION

This application is a continuation-in-part of co-pending application Ser. No. 170,380 filed Mar. 18, 1988 entitled Single Line Compatible Fax System by the common inventor of this application, the teachings of which are incorporated herein by reference.

The present invention relates to telephone and facsimile systems and, more particularly, to telephone apparatus for answering an incoming call over a single telephone line and for automatically switching the call from the telephone to a facsimile machine connected thereto in response to an incoming facsimile call.

Facsimile (FAX) machines are rapidly growing in popularity as they become cheaper and cheaper. One of the target groups for future development and sales is the so-called "low end user", e.g. home offices, small businesses, and individuals for personal and business use. In instances where the user does not wish to install a separate telephone line for the FAX machine, the prior art offers no satisfactory options. The telephone and FAX machine can be connected to a single telephone line through a Y-connector which places the two devices in parallel. Outgoing use of either the telephone or FAX machine is easy with this arrangement; however, the FAX machine, being automatic in its operation when turned on, will tend to grab all the incoming calls. For that reason, the telephone and FAX machine are more commonly connected to a single telephone line through a switch which allows the user to select which of the devices is connected to the common telephone line at any time. When the user wants to use the FAX machine (and at night when unattended), it is switched to the telephone line. The rest of the time, the telephone is connected through the switch. As can be appreciated, this arrangement has many shortcomings as well. If one wants to receive incoming FAX transmissions when out of the office, it is imppossible to have a telephone answering machine to receive incoming telephone calls. Moreover, during the daytime when the office is attended and the switch has the telephone connected to the telephone line, anyone wishing to send a FAX transmission must first call on the telephone and advise the user to switch to the FAX position.

In my above-referenced co-pending patent application, I disclosed a method and apparatus for permitting a telephone and FAX machine to share a common telephone line. In one embodiment therein, there is switching circuitry that accomplishes the testing of the incoming call and the switching thereof to the telephone or FAX machine as appropriate. An incorporation of the switching circuitry into an answering machine is also described. Further, a method and apparatus for having the switching circuitry control a plurality of telephones is also shown.

It is the object of the present invention to provide a master telephone incorporating the above-mentioned switching and multiple telephone control functions into a master telephone which can be plugged into a telephone outlet to thereby control the balance of the telephones connected to the line and a FAX machine plugged into the master telephone.

Other objects and advantages of the present invention will become apparent from the description which follows hereinafter when taken in conjunction with the drawing figures which accompany it.

SUMMARY

The foregoing object has been achieved by the telephone/facsimile system of the present invention including a plurality of telephones and a facsimile device connected to a common telephone line wherein incoming calls are autom̈tically switched from the telephones to the facsimile device as appropriate and the use of a common telephone line for the telephones and the facsimile device for both incoming and outgoing calls is transparent to users comprising, a master telephone including, a telephone handset, telephone circuitry connected to the telephone handset and having a telephone tip and ring input thereto, switch means for switching a telephone line connected thereto at an input thereof between first and second output positions thereof, the switch means having the telephone circuitry tip and ring input operably connected to the first output position thereof and means for connecting the facsimile device to the second output position thereof and, logic means having an input connected to the input of the switch means and an output operably connected to switch the switch means between the first and second output positions for answering an incoming call on the telephone line, for determining whether the incoming call is from a facsimile device, for switching the switch to connect the first output position when an incoming call from a non-facsimile device is detected, and for switching the switch to connect the second output position when an incoming call from a facsimile device is detected, the logic means including means for sensing when a telephone or a facsimile device has been picked up for use in placing an outgoing call and for line until a hang-up condition is sensed; plug receptacle means for receiving a plug operably connected to a cable containing the telephone line connectable to the plug receptacle means at first connections thereof and a pair of spare wires connectable to the plug receptacle means at second connections thereof, the first connections of the plug receptacle means being connected to the input of the switch means; a pair of interconnecting wires operably connected between the first output position of the switch means and the second connections of the plug receptacle means; at least one slave telephone; and, adapter means insertable between tip and ring inputs of the slave telephone and the cable for connecting the tip and ring inputs to the pair of spare wires in the cable.

In the preferred embodiment, the switch means comprises supplemental plug receptacle means for receiving a plug operably connected to a cable operably connected to the facsimile device and connectable to the supplemental plug receptacle means at connections thereof, the connections of the supplemental plug receptacle means being connected to the second output position of the switch means.

DESCRIPTION OF THE DRAWINGS

FIG. 1 is a simplified drawing showing the way the invention of the above-referenced co-pending application of which this is a continuation-in-part acts as a branching point when employed in an environment where more than one telephone is hooked to the telephone line.

FIG. 2 is a simplified drawing showing the prior art use of a terminating plug into a wall receptacle, or the like, to make connection to two of the four wires contained in the telephone cable typically employed for "home" wiring.

FIG. 3 is a simplified drawing in the manner of FIG. 2 showing the plug adapter of the above-referenced co-pending application of which this is a continuation-in-part employed to switch the telephones of the system to receive their signals over the unused two wires of the typical telephone cable.

FIG. 4 is a simplified drawing showing the switching employed in the present invention when connecting a plurality of telephones to the telephone line.

FIG. 5 is a simplified drawing in the manner of FIG. 4 showing the switching employed in the present invention when connecting the FAX machine to the telephone line.

FIG. 6 is a simplified drawing showing the way the master telephone of the present invention acts as a branching point when employed in an environment where more than one telephone is hooked to the telephone line.

FIG. 7 is a partial functional block diagram of the master telephone of the present invention.

DESCRIPTION OF THE PREFERRED AND ALTERNATE EMBODIMENTS

Before beginning the description of the present invention, it should be noted that while the description that follows is directed primarily to the combination of a FAX machine and a telephone sharing a common telephone line, the methods and apparatus described would be equally applicable to a computer with modem, or the like, sharing a common telephone line with a telephone line. Wherefore, it is the inventor's intent that the description and appended claims be accorded a breadth in keeping with the scope and spirit of the invention is disclosed herein despite the concentration on FAX machines in particular.

As with the above-referenced co-pending application of which this is a continuation-in-part, the present invention is based on the proposition that if the source of an incoming call can be determined (i.e. from a FAX machine or a telephone) the call can be switched to the proper device for handling it. The manner of accomplishing this is described in detail in that application and, therefore, in the interest of simplicity and the avoidance of redundancy, no further description of that method and apparatus will be described herein. This application will be limited to the specific implementation of a master telephone to accomplish the combined switching functions described under the Background of the Invention.

An important aspect of the invention of my above-referenced, co-pending application was shown in FIGS. 14–18 thereof which are reproduced as FIG. 1–5 hereof. In most telephone installations, there is more than one telephone 10 connected to the telephone line 12. As depicted in FIG. 1, typically there is a telephone cable 14 which enters the building having a plurality of outlets 16 connected thereto in parallel. The telephones 10 are plugged into the outlets 16 with miniature plugs 18 which have become a standard article in the telephone industry. The standard cable 14 typically employed in most homes and small offices contains four wires 20 having red, green, yellow and black insulation, respectively. The standard telephone, however, employs only the red and green wires as the so-called "tip" and "ring" pair. Thus, as shown in FIG. 2, the plug 18, in many cases, only connects the red and green wires 20. Thus, in the present invention when it is desired to control more than one telephone, the adapter plug 22 of FIG. 3 is employed for all telephones except the master telephone (i.e. the "slave" telephones) and the switching takes place as shown in FIGS. 4 and 5.

As shown in FIG. 6, the master telephone 24 of the present invention is plugged into any outlet 16 in the usual manner with a plug 18 connected to all four of the wires 20 in the cable 14. Each of the slave telephones 10 is plugged into its outlet 16 through an adapter plug 22 of the type shown in FIG. 3 which causes the telephones to be connected in parallel to the unused black and yellow wires 20. As depicted in FIG. 7, the master telephone 24 contains single line switching logic 26 which is operably connected to operate a switch 28 of the type shown functionally in FIGS. 4 and 5. As described in detail in the above-mentioned co-pending application, the switching logic 26 works for controlling both incoming and outgoing calls; that is, the correct device (telephone or FAX) is connected to the telephone line 12 for incoming calls and when either a telephone or FAX is placed in use for an outgoing call (i.e. the user "picks-up" the device), the other type of device is denied access to the telephone line 12 until the logic 26 senses that a "hang-up" condition has taken place. As can be seen from FIG. 7, the single line switching logic 26 is connected to sample and interface with a FAX machine 30 connected to receptacle 32, the master telephone's internal telephone circuitry 34 (of standard design well known to those skilled in the art and, therefore, not to be described in further detail herein), and the incoming tip and ring pair (i.e. telephone line 12) of the cable 14. The master telephone 24 has a case 40 and includes a conventional handset 36 connected to the case 40 and dialing apparatus (not shown) which are operated by the telephone circuitry 34 through tip and ring input wires 38. When the master telephone 24 of the present invention desires to connect the telephones (i.e. itself and the slave telephones 10) to the telephone line 12, the switching function of switch 28 is operated by the single line switching logic 26 to connect the signal on the red and green wires 20 to the yellow and black wires 20. This causes the telephone circuitry 34 of the master telephone 24 to be directly connected to the telephone line 12 through its tip and ring wires 38 and the tip and ring wires of the slave telephones 10 to be connected to the telephone line 12 via the normally unused pair of wires 20 in the cable 14. On the other hand, when the master telephone 24 of the present invention desires to connect the FAX machine 30 to the telephone line 12, the switching function of switch 28 is operated to connect the signal on the red and green wires 20 to the red and green wires 20 connected to the FAX machine 30. As mentioned above, as in the invention of the above-referenced, co-pending application, the single line switching logic 26 includes "pick-up" logic to switch the switch 28 to the proper position for outgoing use by either the FAX 30 or a telephone 24, 10 and "hang-up" logic to disconnect the device when such outgoing use is completed. Thus, the use of the slave telephones 10, in particular, is transparent to users throughout the building. If a user picks-up a slave telephone 10 when the telephone line 12 is not busy, a dial tone is received and the call is placed in usual fashion. If the line is busy with a call from another telephone, the user will "cut-in" just as with any extension phone on a common line. The only area of difference is that when the FAX 30 is using the telephone line 12, a user attempting to use one of the telephones will not get a dial tone. The same is true for a user attempting to use the FAX 30 to send a facsimile when the telephones are in use. No dial tone will be received and any attempted transmission will be unsuccessful. This is an important benefit over the prior art where such transparency does not exist inasmuch as most homes and small businesses where such a single line usage would be of interest include a plurality of telephones throughout the building.

Wherefore, having thus described the present invention, what is claimed is:

1. A master telephone for answering an incoming call over a single telephone line and for automatically switching the call from the telephone to a facsimile device connected thereto when appropriate comprising:
   (a) a telephone handset;
   (b) a case;
   (c) telephone circuitry connected to said telephone handset and having a telephone tip and ring input thereto;
   (d) switch means disposed within said case for switching a telephone line connected thereto at an input thereof between first and second output positions thereof, said switch means having said telephone circuitry tip and ring input operably connected to said first output position thereof and means for connecting the facsimile device to said second output position thereof;
   (e) logic means disposed within said case and having an input connected to said input of said switch means and an output operably connected to switch said switch means between said first and second output positions for answering an incoming call on said telephone line, for determining whether said incoming call is from a facsimile device, for switching said switch means to connect said first output position when an incoming call from a non-facsimile device is detected, and for switching said switch means to connect said second output position when an incoming call from a facsimile device is detected;
   (f) plug receptacle means carried by said case for receiving a plug operably connected to a cable containing said telephone line connectable to said plug receptacle means at first connections thereof and a pair of spare wires connectable to said plug receptacle means at second connections thereof, said first connections of said plug receptacle means being connected to said input of said switch means;
   (g) a pair of interconnecting wires operably connected between said first output position of said switch means and said second connections of said plug receptacle means; and,
   (h) adapter means insertable between tip and ring inputs of a slave telephone and said cable for connecting said tip and ring inputs to said pair of spare wires in said cable.

2. The master telephone of claim 1 wherein said means for connecting the facsimile device to said second output position of said switch means comprises:
   supplemental plug receptacle means carried by said case for receiving a plug operably connected to a cable operably connected to the facsimile device and connectable to said supplemental plug receptacle means at connections thereof, said connections of said supplemental plug receptacle means being connected to said second output position of said switch means.

3. A telephone system capable of answering an incoming call over a single telephone line and for automatically switching the call from a plurality of telephones to a facsimile device connected thereto when appropriate comprising:
   (a) a master telephone including,
   (a1) a telephone handset;
   (a2) telephone circuitry connected to said telephone handset and having a telephone tip and ring input thereto;
   (a3) switch means for switching a telephone line connected thereto at an input thereof between first and second output positions thereof, said switch means having said telephone circuitry tip and ring input operably connected to said first output position thereof and means for connecting the facsimile device to said second output position thereof; and,
   (a4) logic means having an input connected to said input of said switch means and an output operably connected to switch said switch means between said first and second output positions for answering an incoming call on said telephone line, for determining whether said incoming call is from a facsimile device, for switching said switch means to connect said first output position when an incoming call from a non-facsimile device is detected, and for switching said switch means to connect said second output position when an incoming call from a facsimile device is detected;
   (b) plug receptacle means for receiving a plug operably connected to a cable containing said telephone line connectable to said plug receptacle means at first connections thereof and a pair of spare wires connectable to said plug receptacle means at second connection thereof, said first connections of said plug receptacle means being connected to said input of said switch means;
   (c) a pair of interconnecting wires operably connected between said first output position of said switch means and said second connections of said plug receptacle means;
   (d) at least one slave telephone; and,
   (e) adapter means insertable between tip and ring inputs of said slave telephone and said cable for connecting said tip and ring inputs to said pair of spare wires in said cable.

4. The master telephone of claim 3 wherein said means for connecting the facsimile device to said second output position of said switch means comprises:
   supplemental plug receptacle means for receiving a plug operably connected to a cable operably connected to the facsimile device and connectable to said supplemental plug receptacle means at connections thereof, said connections of said supplemental plug receptacle means being connected to said second output position of said switch means.

5. A telephone/facsimile system including a plurality of telephones and a facsimile device connected to a common telephone line wherein incoming calls are automatically switched from the telephones to the facsimile device as appropriate and the use of a common telephone line for the telephones and the facsimile device for both incoming and outgoing calls is transparent to users comprising:
   (a) a master telephone including,
   (a1) a telephone handset;

(a2) telephone circuitry connected to said telephone handset and having a telephone tip and ring input thereto;

(a3) switch means for switching a telephone line connected thereto at an input thereof between first and second output positions thereof, said switch means having said telephone circuitry tip and ring input operably connected to said first output position thereof and means for connecting the facsimile device to said second output position thereof; and, (a4) logic means having an input connected to said input of said switch means and an output operably connected to switch said switch means between said first and second output positions for answering an incoming call on said telephone line, for determining whether said incoming call is from a facsimile device, for switching said switch means to connect said first output position when an incoming call from a non-facsimile device is detected, and for switching said switch means to connect said second output position when an incoming call from a facsimile device is detected, said logic means including means for sensing when a telephone or a facsimile device has been picked up for use in placing an outgoing call and for connecting only the picked up type of device to said telephone line until a hang-up condition is sensed;

(b) a plug receptacle means for receiving a plug operably connected to a cable containing said telephone line connectable to said plug receptacle means at first connections thereof and a pair of spare wires connectable to said plug receptacle means at second connections thereof, said first connections of said plug receptacle means being connected to said input of said switch means;

(c) a pair of interconnecting wires operably connected between said first output position of said switch means and said second connections of said plug receptacle means;

(d) at least one slave telephone; and, (e) adapter means insertable between tip and ring inputs of said slave telephone and said cable for connecting said tip and ring inputs to said pair of spare wires in said cable.

6. The telephone/facsimile system of claim 5 wherein said means for connecting the facsimile device to said second output position of said switch means comprises:

supplemental plug receptacle means for receiving a plug operably connected to a cable operably connected to the facsimile device and connectable to said supplemental plug receptacle means at connections thereof, said connections of said supplemental plug receptacle means being connected to said second output position of said switch means.

* * * * *